United States Patent
Broderick

(10) Patent No.: US 8,141,477 B2
(45) Date of Patent: Mar. 27, 2012

(54) MASH/LAUTER TUN AND METHOD OF USE THEREOF

(76) Inventor: William Broderick, Newnan, GA (US)

( * ) Notice: Subject to any disclaimer, the term of this patent is extended or adjusted under 35 U.S.C. 154(b) by 988 days.

(21) Appl. No.: 12/119,917

(22) Filed: May 13, 2008

(65) Prior Publication Data

US 2009/0285971 A1   Nov. 19, 2009

(51) Int. Cl.
*C12H 1/00* (2006.01)
*C12C 7/17* (2006.01)

(52) U.S. Cl. ............ 99/276; 99/277.2; 99/278; 210/521; 210/514; 435/291.1

(58) Field of Classification Search ............... 99/276, 99/277, 278, 418, 415, 456, 277.2; 210/482, 210/514, 521; 426/15, 29, 392, 459, 489, 426/490, 627; 435/291.1, 292.2
See application file for complete search history.

(56) References Cited

U.S. PATENT DOCUMENTS

| | | | |
|---|---|---|---|
| 718,967 A * | 1/1903 | Merritt | ............... 415/202 |
| 1,201,268 A * | 10/1916 | Davis | ............... 210/172.2 |
| 3,563,157 A * | 2/1971 | Lenz | ............... 99/278 |
| 4,351,231 A | 9/1982 | Wolfseder | |
| 4,494,451 A | 1/1985 | Hickey | |
| 4,505,941 A | 3/1985 | Raines | |
| 4,542,682 A | 9/1985 | Hancock | |
| 4,653,388 A | 3/1987 | Wilkinson | |
| 4,837,156 A | 6/1989 | Lampinen | |
| 4,844,932 A | 7/1989 | Daoud | |
| 6,000,094 A * | 12/1999 | Young | ............... 15/264 |
| 6,571,810 B1 * | 6/2003 | McClure et al. | ............... 134/111 |
| 2002/0048620 A1 | 4/2002 | Stippler et al. | |
| 2005/0252843 A1 * | 11/2005 | Saito | ............... 210/269 |

* cited by examiner

*Primary Examiner* — Reginald L Alexander
(74) *Attorney, Agent, or Firm* — Williamson Intellectual Property Law, LLC; Thomas R. Williamson, III

(57) ABSTRACT

A mash/lauter tun and method of converting grains to wort. The mash/lauter tun comprises a container with a double false bottom filter having two perforated plates disposed parallel with a space therebetween for receiving filtration media. The container further comprises thermometers extending to near the center of the tun and a rotating heat exchanger. In use, mash is loaded into the container and heated via the rotating heat exchanger by passing hot fluid through the rotating heat exchanger. The mash is then sparged by increasing pressure in the rotating heat exchanger above a threshold pressure via closure an outlet valve of the heat exchanger. The wort then passes through the double false bottom filter and is subsequently transferred to a brew kettle for boiling.

8 Claims, 7 Drawing Sheets

MASH/LAUTER TUN AND METHOD OF USE THEREOF

CROSS-REFERENCE TO RELATED APPLICATIONS

None

FEDERALLY SPONSORED RESEARCH OR DEVELOPMENT

None

PARTIES TO A JOINT RESEARCH AGREEMENT

None

REFERENCE TO A SEQUENCE LISTING

None

BACKGROUND OF THE INVENTION

1. Technical Field of the Invention

The present invention relates generally to a mash/lauter tun and method of use thereof, and more specifically to a mash/lauter tun comprising a container with a double false bottom filter comprised of two perforated plates disposed parallel with a space therebetween for receiving filtration media. The container further comprises thermometers extending to near the center of the tun and a rotating heat exchanger with sparge nozzles.

2. Description of Related Art

Brewing is a complicated and delicate process, which is described in detail below. It is the production of alcoholic beverages and alcohol fuel through fermentation, whereby sugars get converted into alcohol. The exact process of brewing has generally remained stable over time; however, the equipment for conducting the process has seen changes, particularly for the home brewing community. The process of brewing beverages from grain, notably beer, begins with two primary raw materials: malted barley and liquid water. Other grains, such as, for exemplary purposes only, wheat, may also be utilized. Wort for brewing the beer is obtained from mashing the barley, and is later brewed with hops to obtain the desired taste. Lastly, yeast is added to ferment the sugars into alcohol.

Generally, home brewers invest a great deal time and energy into the process of brewing their own beer. First, the malted barley is added to form a slurry in a bath of warm water, which needs to be held at a constant temperature (typically between 148-158 degrees Fahrenheit). The mixed content of malted barley and water is referred to as mash and undergoes a process known as mashing. During the mashing process, enzymes cause chemical reactions to break down the complex starches in the barley into simpler sugars, thus making "wort". Wort refers to the liquid extracted from the mashing process and contains the sugars that will later be fermented to produce alcohol. This production of wort takes places in a vessel known to those skilled in the art as a mash tun.

Secondly, separation of the wort from the mash, often regarded as the most difficult step in the brewing process, comes next, and is initiated when the temperature of the mash is raised to around 170 degrees Fahrenheit. In previous brewing systems, this separation stage usually takes place in a separate vessel, known to those in the art as a lauter tun. Lauter tuns contain the necessary components needed for the separation process; more specifically, they contain a sparger and a false-bottom filter. The sparger sprinkles hot water over the grain bed to rinse any remaining sugars from the grains, while the filter allows the sugar water (wort) to drain out of the vessel, while still holding the granular remains inside the vessel.

Two common systems have arisen in home brewing to streamline the brewing process described above: Recirculating Infusion Mash System (RIMS) and Heat Exchanged Recirculating Mash System (HERMS). Both of these systems continuously re-circulate the wort either through an electric heating element (RIMS), or through coils located in a separate hot liquid tun (HERMS). Recirculation of the wort through the mash allows the mash to either maintain its current temperature, thus continuing the mashing process, or the temperature of the mash can be raised to halt the mashing process and start the separation stage. However, the above systems come with potential drawbacks. First, the time it takes to raise the mash to the temperature required to transition from the mashing process to the separation process is considerable for both systems. To decrease this time, the wort would have to be heated to potentially dangerous or damaging temperatures, as even the slightest excessive rise in temperature will essentially scorch and thus ruin the wort.

Secondly, the systems require that the wort constantly be recirculated, which has several disadvantages in and of itself. Separation of the wort from the mash is often regarded as a highly difficult step due to the delicate nature of the wort and mash, and, as such, adding the wart back to the mash and causing repeated separations can eventually build to several large problems. If the wart is drained too fast, the mash bed may lack buoyancy and will instead compact against the false-bottom drain, essentially sealing it off. Also, continuous recirculation of the wart through the mash can lead to uneven heating in the form of stratified heat layers, thereby decreasing the wart quality. Accordingly, an apparatus that decreases the time to change the mash temperature and separate the mash is beneficial.

Other devices have sought to counter some of the inherent flaws of current home-brewing equipment, particularly the problem of combining operations into a single mash/lauter tun. Present devices teach methods of separation of the wart from the mash, whereby the mash goes through several filtrations with the goal of obtaining the most pure wort possible. The mash makes its way through progressively more selective filters, such that for each filter passed, more grain will be filtered out and more pure wort will be allowed to drain through. However, for these filtrations to work, the entire process must be spaced apart over subsequent steps instead of one continuous step to minimize the chances of clogging one of the filters. Such clogged filters must be periodically back-flushed to clear the filter surface. Accordingly, an apparatus that eliminates the step of having to reverse the flow of filtrate through the filters to flush the system of any inevitable build-up is advantageous.

Furthermore, most systems lack the ability to be readily cleaned of residual wort upon the completion of processing. Thus, sanitation issues can arise if such devices are not thoroughly cleaned.

Another mash/lauter tun teaches a heating system that does not entirely depend on the recirculation of wort through the mash to either maintain or raise the mash temperature. Instead the heating process is aided by a separate hot water tank that partially surrounds the mash tun. By raising the temperature of the water inside the hot water tank, the mash is heated by conduction. However, this system potentially suffers from severe uneven heating conditions of the mash, because the mash to the outside of the mash/lauter tun will be heated more rapidly to a higher temperature than the mash in the center of the tun, thus leading ultimately to decreased wort quality. Also, control of the mash temperature remains through indirect means, making specific, and sometimes very minor, temperature adjustments a difficult and long task. As such, a mash/lauter tun apparatus that provides for even heating conditions is advantageous.

Lastly, there are mash/lauter tuns that utilize known rotating heat exchangers inside the tun vessels. Hot liquid or steam is passed though rotating tubes, thereby heating the mash that surrounds them. As these tubes are in constant rotation within the vessel, they actively mix the mash as they heat it, thus more evenly distributing heat amongst different parts of the mash. The devices with a rotating heat exchanger inside the mash/lauter tun follow a generic pattern for the heating tubes, typically either two coil arms festooned from top to bottom (one hundred eighty degrees separation) or four arms (ninety degree separation). That is, the tubes are not positioned in such a manner as to lead to maximum heating efficiency of the mash and preclude utilization of thermostats or other measuring instruments from being effectively utilized, since such instruments would be impacted by rotation of the tubes if they extend to the center of the mash. However, the downfall of such previous devices is that the tubes of the heat exchanger do not extend through a large portion of the mash. As such, it would be beneficial for an apparatus that provides a larger surface area of contact with the mash and that leaves space for measuring instruments to extend to near the center of the mash.

Stirring of the mash by the rotating heat exchanger also leads to grinding of the mash grains against bottom filters, particularly when utilizing the stainless steel filters of many devices, wherein the grinding reduces the size of the grains such that same pass through the filter and remain with recovered wort, thereby contaminating same. Accordingly, softer filter materials are desirable to minimize grinding of the mash grains.

Therefore, it is readily apparent that there is a need for a mashing and lautering apparatus that efficiently heats the mash without overheating and which accommodates measuring instruments that extend through the mash, and which further permits easy separation of the wort from the mash without clogging the filter bed.

BRIEF SUMMARY OF THE INVENTION

Briefly described, in a preferred embodiment, the preferred and alternate embodiments herein overcome the above-mentioned disadvantages and meet the recognized need for such an apparatus by providing a mash/lauter tun and method of converting grains to wort, and more specifically a mash/lauter tun comprising a container with a double false bottom filter having two perforated plates of polymeric material disposed parallel with a space therebetween for filter media, wherein the container further comprises thermometers and a rotating heat exchanger, and wherein the thermometers extend near the center of the mash without being contacted by the rotating heat exchanger.

According to its major aspects and broadly stated, the present invention in its preferred form is a mash/lauter tun comprising a container and a double false bottom filter having two perforated plates disposed parallel with a space therebetween. The two perforated plates comprise a seal of, for exemplary purposes only, silicone rubber, on the periphery of the two perforated plates.

The container comprises an inside having thermometers and a rotating heat exchanger having arms defining at least one plane and having extensions therefrom. The extensions extend approximately perpendicular to the plane. The rotating heat exchanger further comprises gaps dimensioned to permit passage of the thermometers without the rotating heat exchanger contacting the thermometers. The rotating heat exchanger comprises a fluid inlet, a fluid outlet and at least one sparge nozzle. The sparge nozzles open when the fluid outlet is closed, thereby increasing pressure within the rotating heat exchanger above a threshold pressure. Once the threshold pressure is met, the fluid outlet regulates the outflow of water via tubing and a valve that is connected to a hot water heater. The fluid inlet allows the inflow of water to the heat exchanger from a hot water heater via tubing and a valve and is in fluid communication with the rotating heat exchanger.

On top of the container is a removable lid and on the bottom of the container is a drain manifold. The removable lid has an outlet in fluid communication with the hot water heater and the rotating heat exchanger to permit water to flow out of the heat exchanger. Additionally, the bottom of the container comprises a wort outlet that connects to a wort container via tubing and a valve.

The mash/lauter tun further comprises a method of converting brewing grains to wort. The method of converting brewing grains to wort comprises the steps of obtaining a mash/lauter tun having at least one thermometer extending proximate the center of the mouth/lauter tun and a rotating heat exchanger comprising coils with at least one pressure-operated sparge nozzle. Mash is then heated within the mash/lauter tun by passing fluid through the heat exchanger. The wort is then sparged by increasing pressure in the rotating heat exchanger above a threshold pressure, wherein the sparge nozzle opens at the threshold pressure. Wort is then passed through a double false bottom filter for recovery, while the filter retains the mash grains, rejecting same from the wort. The wort is then transferred from the mash/lauter tun to the wort container. As such, an advantage of the present invention is its ability to streamline the process of transferring the wort from the mash/lauter tun to the wort container.

More specifically, the present invention is a mash/lauter tun system having a mash/lauter tun, a water heater and a wort container. The wort container comprises, for exemplary purposes only, a brew kettle. The mash/lauter tun comprises a tank for holding mash having a top, a sidewall and a bottom. A lid is disposed on top of the top of the tank and is secured to the tank via lid hold downs. The sidewall of the tank has thermometers disposed therein, and the thermometers extend through to near the center of the tank.

The heat exchanger comprises gaps surrounding the thermometers. The thermometers are secured to the tank via fasteners. A riser is disposed at the bottom of the tank underneath a base. The mash/lauter tun further comprises a hot water inlet and a wort outlet both disposed on and through the riser. The hot water inlet comprises a hot water valve and the wort outlet comprises a wort outlet valve. The hot water inlet is in fluid communication with the hot water tubing and the flow of water into the hot water inlet is controlled by the hot water valve. Similarly, the wort outlet is in fluid communication with wort transfer tubing, and the flow of wort out of the wort outlet is controlled via the wort outlet valve.

Additionally, the mash/lauter tun is disposed on a tray of a cart. The cart comprises a base and is supported via legs mounted on the base. The cart is disposed on wheels that facilitate movement of the cart. A water heater and a wort container are disposed on jet cookers on the base of the cart. The jet cookers provide heat sources for heating water in the water heater and brewing the wort in the wort container. The jet cookers are fueled from a gas supply. It will be recognized by those skilled in the art that any known means could provide heat to the wort container without departing from the spirit of the preferred embodiment, such as, for exemplary purposes only, electric heaters.

The water heater comprises a tank having a front, a back, a top, a bottom, a hot water return inlet and a hot water supply. The hot water return inlet is disposed at the top of the tank and is selectively opened via a hot water return shut off valve. The hot water supply is located at the bottom of the tank and selectively controls the flow of water into the hot water inlet via the hot water inlet valve. The hot water supply provides hot water to a pump via hot water tubing. The water heater is in fluid communication with the pump via the hot water tubing.

The wort container comprises a tank and a lid. The tank comprises a top and a bottom. The lid of the wort container is disposed over the top of the wort container and also comprises an opening and a handle.

The mash/lauter tun and the water heater are in fluid communication via water return tubing. The water return tubing fluidly connects the hot water outlet to the hot water return inlet of the water heater. The hot return shut off valve controls the flow of water from the mash/lauter tun into the water heater. It will be recognized by those skilled in the art that any known means may be utilized to control the flow and movement of water from the mash/lauter tun to the water heater other than tubing and a valve. Alternately, instead of tubing, fluid communication between the mash/lauter tun, the water heater and/or the wort container could be hard plumbed with pipe. Also alternately, connections could be made from quick disconnects that can be switched to change the flow direction through the rotating heat exchanger, should such be selected. It will be recognized by those skilled in the art that all tubing connections could be made utilizing quick disconnects. Further, use of quick disconnects could obviate the need for controlling valves.

Additionally, the mash/lauter tun and the water heater are in fluid communication via the hot water tubing. The hot water tubing connects the hot water supply to hot water inlet via a pump. The hot water tank drain valve may be selectively utilized to control the flow of fluid from the water heater to the mash/lauter tun when hot water is no longer needed or for disassembly to clean the mash/lauter tun. It will be recognized by those skilled in the art that any known means could be utilized to control the flow and movement of water from the mash/lauter tun to the water heater. Particularly as noted above, instead of tubing, fluid communication between the mash/lauter tun and the water heater could be achieved by hard plumbing with pipe.

Further, the mash/lauter tun is in fluid communication with the wort container via the wort transfer tubing. The wort outlet valve controls the flow of wort runoff from the mash/lauter tun to the wort container. The wort runoff is transferred via the wort transfer tubing. It will be recognized by those skilled in the art that any known means in the art may be utilized to control the flow and movement of wort runoff from the mash/lauter tun to the wort container. Particularly, instead of tubing, for exemplary purposes only, fluid communication between the mash/lauter tun to the wort container could be achieved via hard plumbing with pipe Additionally, the mash/lauter tun comprises a heat exchanger and a double false bottom filter. The double false bottom filter is disposed at the base of the tank. Thermometers comprise tips that extend to near the center of the tank of the mash/lauter tun in order to provide indication of temperature near the center of the mash. Any number of thermometers could be utilized in any position, top, middle or bottom, to monitor striation of heat from top to bottom of the mash/lauter tun.

The heat exchanger comprises primary loops in fluid communication with secondary loops. Primary loops comprise three hundred and sixty degree coils having pinch points therein and the pinch points block flow therethrough. The secondary loops are in fluid communication with the outer loops and the inner loops. The pinch points direct the flow of water or liquid through the outer loops, but are not in fluid communication with the outer and inner loops, thereby providing structural strength to the heat exchanger. The secondary loops further comprise, and are in fluid communication with tops. The tops comprise first ends in fluid communication therewith. Similarly, the second ends are in fluid communications with spargers disposed thereon. The spargers comprise pressure releases to permit flow of water through a design-selected pressure threshold has been reached, thereby providing sprinkling of water supplied through the rotating heat exchanger to sparge the mash.

The secondary loops further comprise gaps and the thermometers extend through the gaps to near the center of the tank. The gaps permit rotation of the heat exchanger without the same impacting the thermometers.

The double false bottom filter comprises a top panel and a bottom panel. The top panel and the bottom panel comprise apertures that permit passage of fluid therethrough while rejecting passage of mash grains and/or their husks. The bottom panel further comprises standoffs and a throughhole at the center thereof. The throughhole is dimensioned to permit passage of lower feed of the heat exchanger therethrough. The top panel comprises separators and a throughhole at the center thereof and the throughhole permits passage of the lower feed therethrough. When assembled, the top panel is disposed on the bottom panel and separators support the top panel on the bottom panel, forming a space between the top panel and the bottom panel. The space is optionally filled with a selected filter medium such as rice hulls. The standoffs support the double false bottom filter above the base of the tank, to permit flow of wort through the double false bottom filter to the base for collection.

The underneath of the mash/lauter tun comprises a drain and a manifold. The manifold is in fluid communication with the wort outlet. Further, the underneath of the mash/lauter tun comprises the hot water inlet and the flow of water is controlled via the hot water inlet valve.

The lid of the mash/lauter tun comprises a rear and a front access. The rear and the front access are hingedly secured via a hinge. The lid also comprises a handle that is disposed on the front access to lift same to provide access to interior of the mash/lauter tun. Disposed on top of the lid is an upper support, a lower support, a drive sprocket and a heat exchanger sprocket, wherein the drive sprocket is rotated by a motor, and wherein the drive sprocket moves a chain that rotates the heat exchanger sprocket that is secured to the heat exchanger. Thus, the rotating heat exchanger can be rotated by operation of the motor and a swivel bushing permits said rotation without leaking fluid.

In use, selected grains are loaded into the tank of the mash/lauter tun, and water is added to form mash. The mash is continuously heated and stirred via the heat exchanger. Hot water is introduced to the heat exchanger by opening the hot water inlet, thereby passing hot water through the heat exchanger via the hot water inlet valve. The hot water is circulated through the primary and second loops of the heat exchanger. As the mash is heated, the heat exchanger is rotated, thereby stirring the mash. The mash is heated and stirred until the mash reaches a threshold temperature as recorded by the thermometers, thereby producing wort. It will be recognized by those skilled in the art that the thermometers could comprise thermocouples and could be in electrical communication with a controller (not shown) to automate the entire mashing/lautering process. In such alternate configuration, all valves could be solenoid or similar valves, without limitation.

After wort is produced, the separation process begins. Much of the wort drains off of the grains during the mashing process and is collected at the base. When mashing is complete, hot water is sprayed over the wort via the spargers, thereby rinsing liquid wort off the grains and allowing the wort to pass to the base for collection. The mash rests on, and is retained by, the double false bottom filter and the liquid wort flows through the apertures of the top panel, then through the filter medium and subsequently through the bottom panel. The liquid wort then exits the tank via the drains through the manifold and flows into the wart container by selectively opening the wart outlet via the wort outlet valve. The liquid wort is transferred from the mash/lauter tun to the wort container via the wort transfer tubing. Once the liquid wort is transferred to the wort container, it can be boiled and transferred to a fermenter to produce alcohol.

In an alternate embodiment, quick disconnects could be utilized to secure the various tubing to facilitate cleaning and/or redirection of flow. For instance, switching the quick disconnects of the heat exchanger would optionally reverse the flow of fluid in the heat exchanger.

Accordingly, a feature and advantage of the present invention is its ability to tumble the mash/grains and circulate the wart evenly through the mash lauter/tun via the heat exchanger.

Another feature and advantage of the present invention is its ability to ensure that the wart is readily separated from the mash for collection.

A further feature and advantage of the present invention is its ability to eliminate the need for the wort to be removed from the mash tun for heating purposes, thereby decreasing time and the possibility of scorching of the wort.

Yet another feature and advantage of the present invention is its ability to provide sparge water from the heat exchanger already present in the tun.

Still another feature and advantage of the present invention is its ability to eliminate the shredding and crushing of grain by the double false bottom filter.

Yet still another feature and advantage of the present invention is its ability to incorporate a false bottom with a filter, thereby ensuring retention of the mash during the sparging process.

Still a further feature and advantage of the present invention is its ability to be easily cleaned, thereby reducing or eliminating sanitation issues of residual wort remaining in the system.

Still yet another feature and advantage of the present invention is that it reduces and/or prevents shredding of the mash grains.

These and other features and advantages of the present invention will become more apparent to one skilled in the art from the following description and claims when read in light of the accompanying drawings.

BRIEF DESCRIPTION OF THE SEVERAL VIEWS OF THE DRAWINGS

The present invention will be better understood by reading the Detailed Description of the Preferred and Selected Alternate Embodiments with reference to the accompanying drawing figures, in which like reference numerals denote similar structure and refer to like elements throughout, and in which.

DETAILED DESCRIPTION OF THE PREFERRED AND SELECTED ALTERNATE EMBODIMENTS OF THE INVENTION

In describing the preferred and selected alternate embodiments of the present invention, as illustrated in FIGS. 1-9, specific terminology is employed for the sake of clarity. The invention, however, is not intended to be limited to the specific terminology so selected, and it is to be understood that each specific element includes all technical equivalents that operate in a similar manner to accomplish similar functions.

Brewing comprises several steps in which malted barley is converted to mash, and mash is converted to wort. In order to accomplish this process, malted barley is mixed with warm water and held at a constant temperature, thereby forming mash. Once mash is formed, wort is produced by undergoing mashing and separating. During the mashing process, enzymes cause chemical reactions to break down the complex starches in the barley into simple sugars, thus making wort. As described more fully hereinabove and below, the production of wort takes place in a mash/lauter tun and the separation of the wort from the mash is accomplished via a double false bottom filter in mash/lauter tun.

Figure 1:
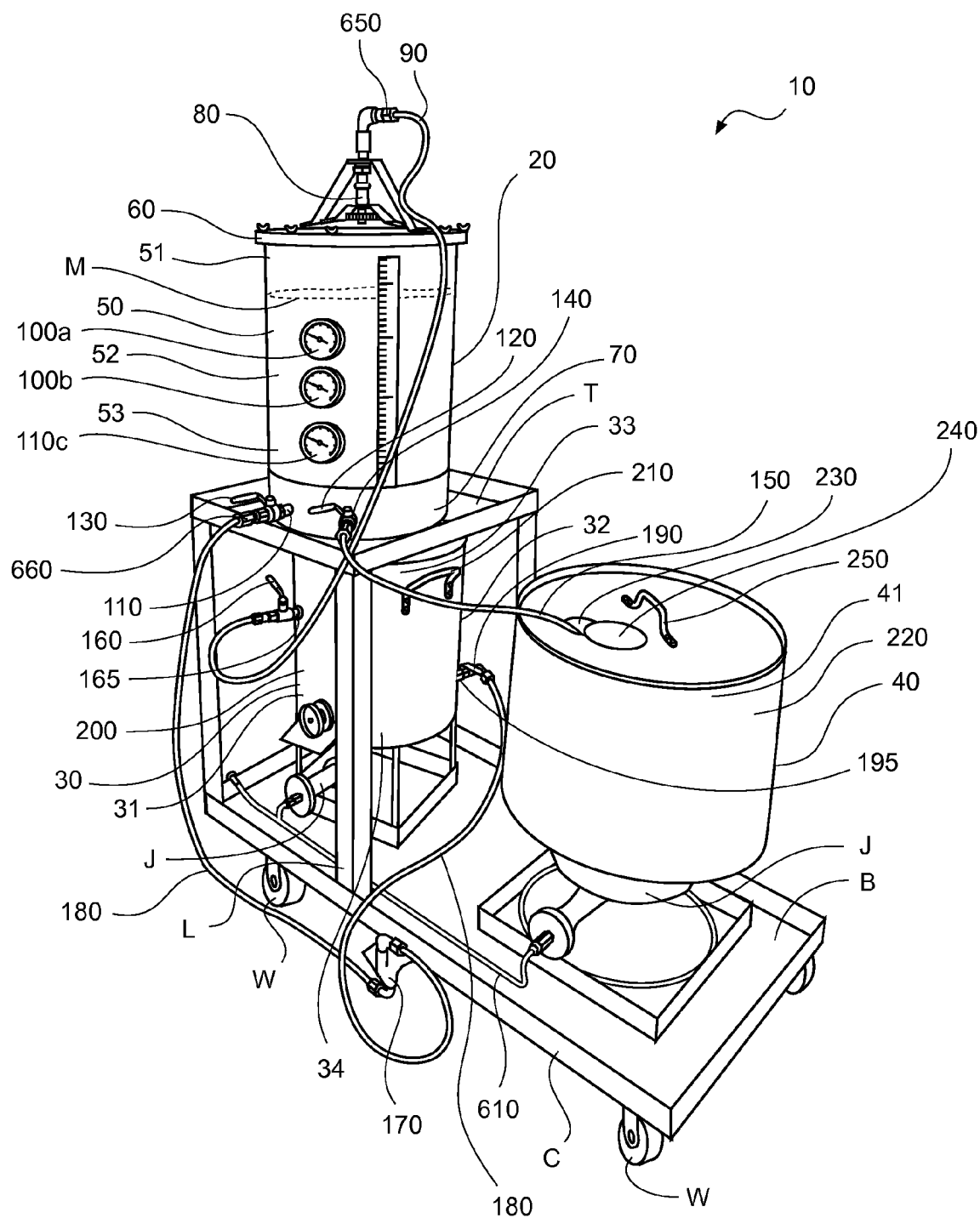
FIG. 1 is a perspective view of a mash/lauter tun system according to a preferred embodiment.
Figure 2:
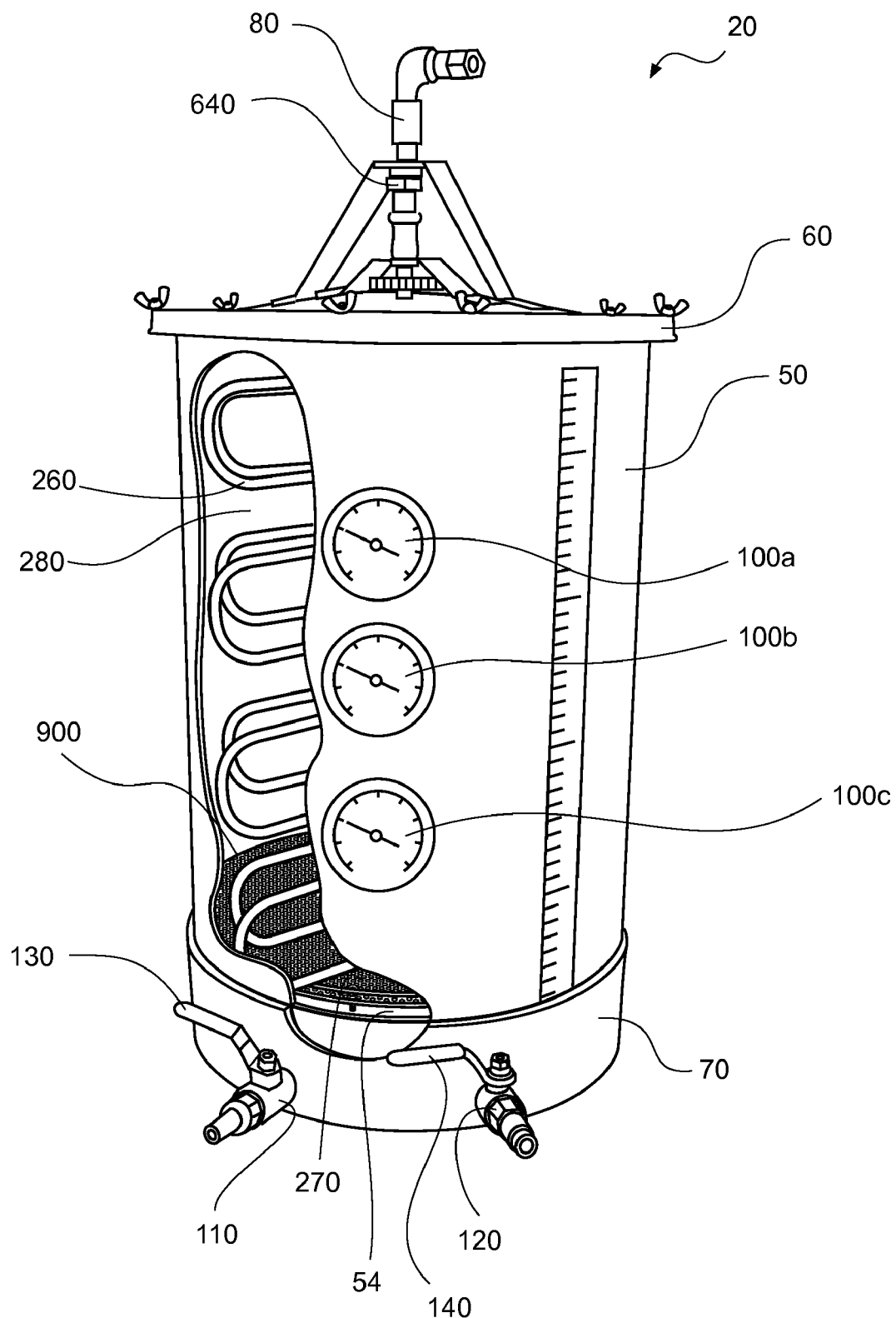
FIG. 2 is a cutaway perspective view of a mash/lauter tun according to a preferred embodiment, showing a heat exchanger and double false bottom in the interior of the mash/lauter tun.
Figure 3:
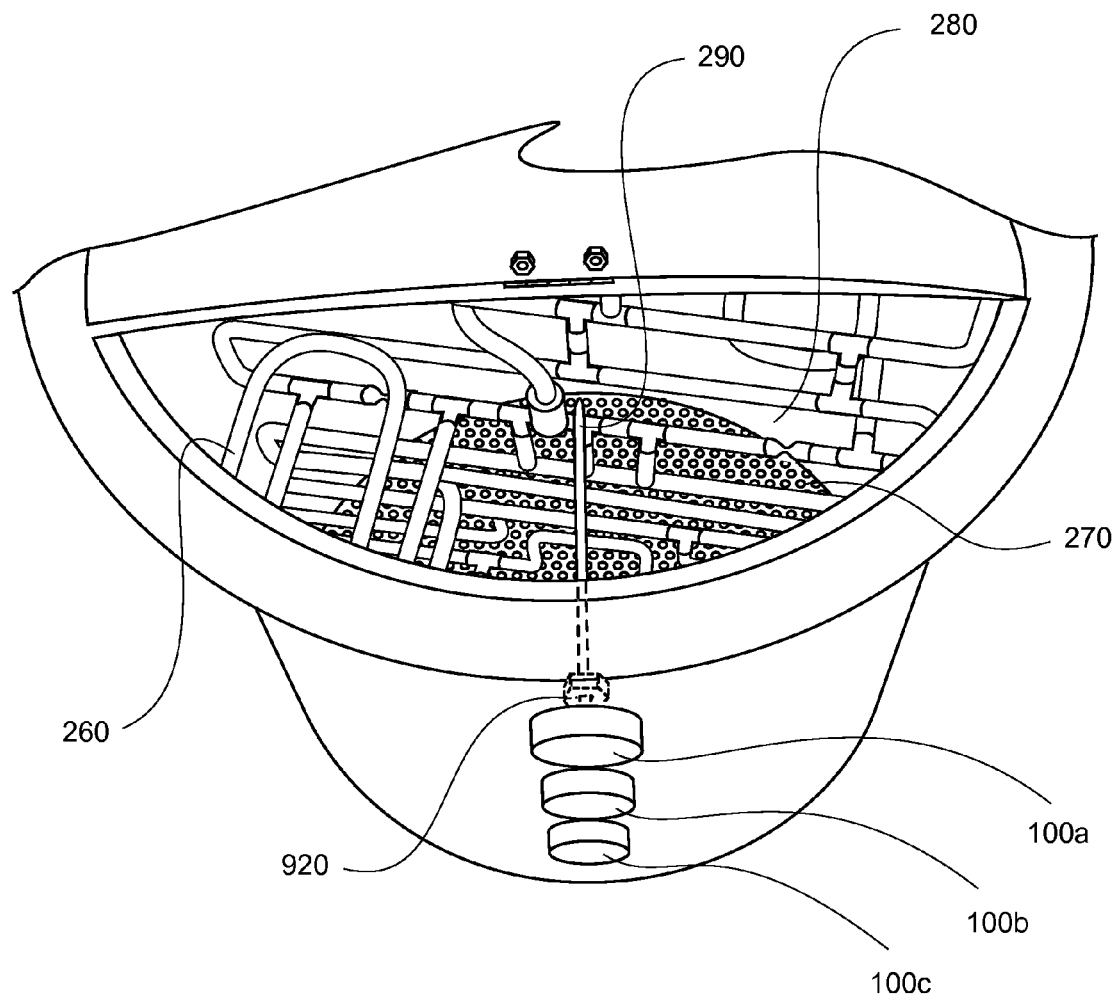
FIG. 3 is a top cutaway perspective view of a mash/lauter tun according to an alternative embodiment, showing a heat exchanger, thermometers and a double false bottom in the interior of the mash/lauter tun.

Referring now to FIGS. 1-3, a preferred embodiment is mash/lauter tun system 10, wherein mash/lauter tun system 10 comprises mash/lauter tun 20, water heater 30 and wort container 40, and wherein wort container 40 comprises, for exemplary purposes only, a brew kettle. Mash/lauter tun 20 comprises tank 50 for holding mash M (best shown in FIG. 1), wherein tank 50 comprises top 51, sidewall 52, bottom 53, and base 54 (best shown in FIG. 2). Mash/lauter tun 20 further comprises heat exchanger 260 and double false bottom filter 270 disposed therewithin, wherein double false bottom filter 270 is sealed to tank 50 via seal 900, and wherein seal 900 prevents mash M from traveling past double false bottom filter 270 around the edges thereof. Seal 900 can be any suitable material as is known in the art for sealing two surfaces together, such as, for exemplary purposes only, silicone rubber. Lid 60 is disposed on top of top 51 of tank 50, wherein lid 60 is secured to tank 50 via lid hold downs 570 (best shown in FIG. 9) Sidewall 52 of tank 50 has thermometers 100a, 100b, 100c disposed therein, wherein thermometers 100a, 100b, 100c extend through to near the center of tank 50.

Figure 4:
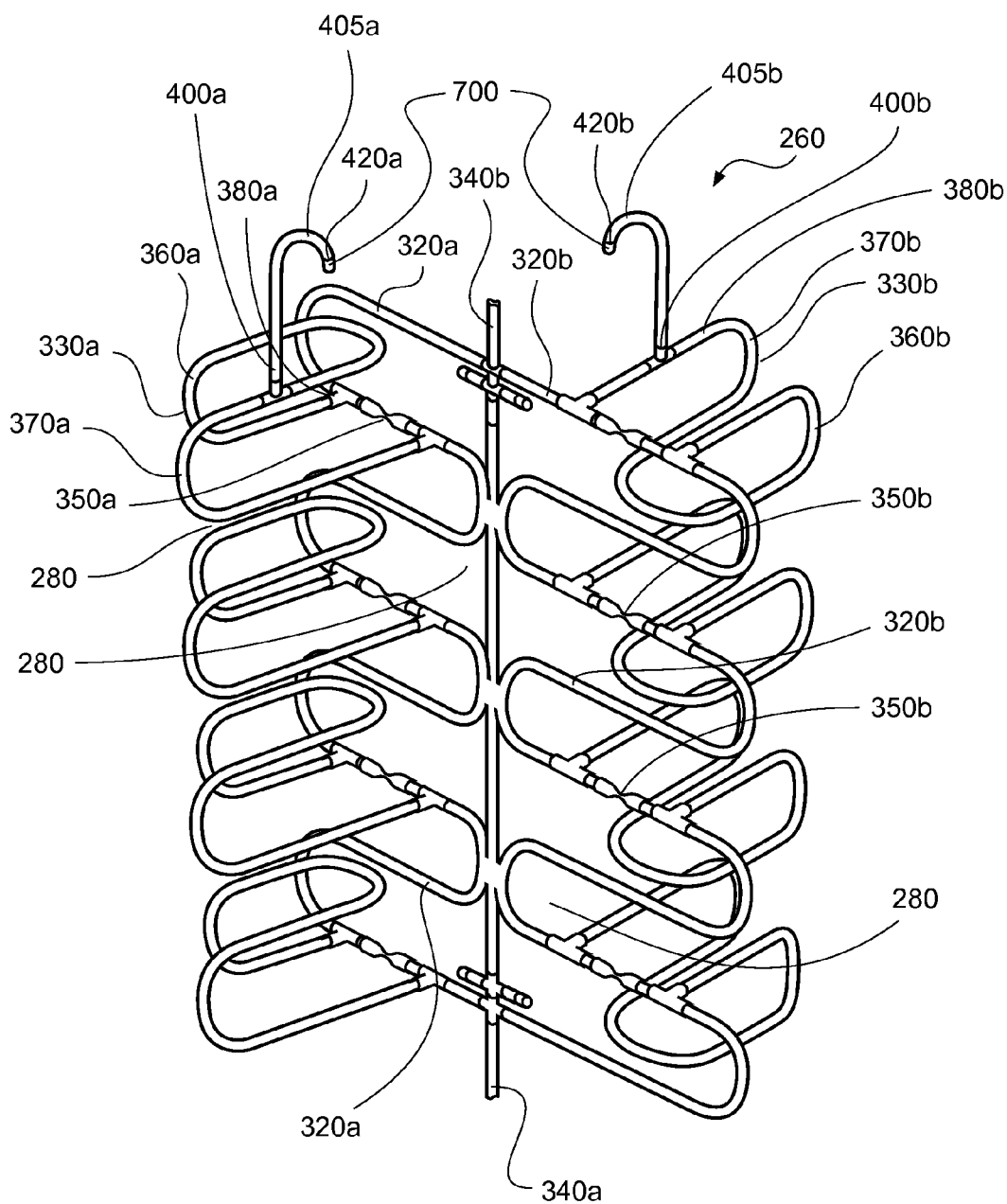
FIG. 4 is a perspective view of a heat exchanger according to a preferred embodiment.
Figure 5:
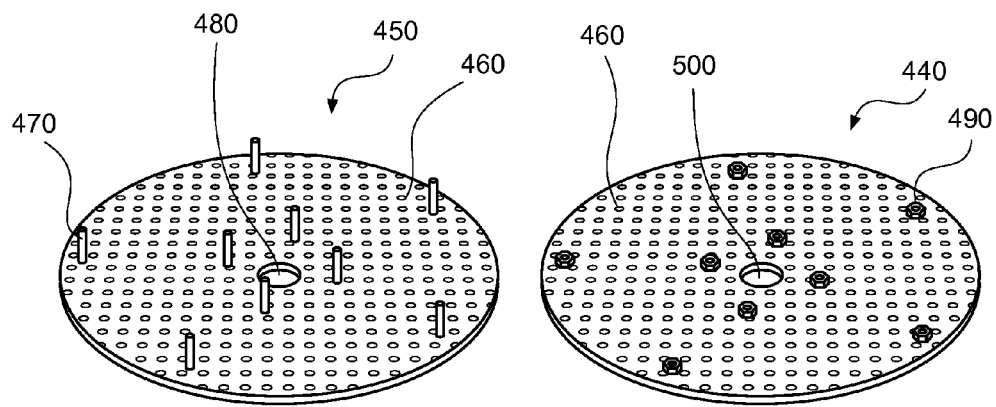
FIG. 5 is a perspective view of perforated plate components of a double false bottom filter according to a preferred embodiment.

Turning now more specifically to FIGS. 3-5, heat exchanger 260 comprises gaps 280 surrounding thermometers 100a, 100b, 100c, wherein thermometers 100a, 100b, 100c are secured to tank 50 via fasteners 920. Riser 70 is disposed at bottom 53 of tank 50 underneath base 54. Mash/lauter tun 20 further comprises hot water inlet 110 and wort outlet 120 both disposed on and through riser 70, wherein hot water inlet 110 comprises hot water valve 130, and wherein wort outlet 120 comprises wort outlet valve 140. Hot water inlet 110 is in fluid communication with hot water tubing 180, wherein flow of water into hot water inlet 110 is controlled by hot water valve 130. While any fluid can be utilized for heat exchanging, water is preferred to permit the sparging operation, as discussed hereinbelow. Similarly, wort outlet 120 is in fluid communication with wort transfer tubing 150, wherein flow of wort out of wort outlet 120 is controlled by wort outlet valve 140. Further, mash/lauter tun 20 is disposed on tray T of cart C, wherein cart C comprises base B and tray T, and wherein tray T is supported via legs L mounted on base B, and wherein cart C is disposed on wheels W, and wherein wheels W facilitate movement of cart C. Additionally, water heater 30 is disposed on one of jet cookers J on base B of cart C and wort container 40 is disposed on the other of jet cookers J on base B of cart C, wherein jet cookers J provide heat sources for heating water in water heater 30 and for heating wort in wort container 40.

Water heater 30 comprises tank 200 having front 31, back 32, top 33 and bottom 34, hot water return inlet 165 and hot water supply 195, wherein hot water return inlet 165 is disposed at top 33 of tank 200 and is selectively opened or closed via hot water return shut off valve 160, and wherein hot water supply 195 is located at bottom 34 of tank 200 and selectively controls flow of water or hot fluid into hot water inlet 110 via hot water inlet valve 130. Hot water supply 195 provides hot water or fluid to pump 170 via hot water tubing 180, wherein water heater 30 is in fluid communication with pump 170 via hot water tubing 180. Further, water heater 30 is disposed on one of jet cookers J, wherein the jet cooker J heats water or fluid in water heater 30, and wherein jet cookers J are fueled from gas supply 610. It will be recognized by those skilled in the art that any known means to provide heat to water heater 30 could be utilized without departing from the spirit of the preferred embodiment, such as, for exemplary purposes only, electric heaters.

Wort container 40 comprises tank 220 and lid 240, wherein tank 220 comprises top 41 and bottom 42, and wherein lid 240 is disposed over top 41, and wherein lid 240 comprises opening 230 and handle 250. Wort container 40 is disposed on one of jet cookers J, wherein the jet cooker J heats wort in wort container 40 and is fueled from gas supply 610. It will be recognized by those skilled in the art that any known means could provide heat to wort container 40 without departing from the spirit of the preferred embodiment, such as, for exemplary purposes only, electric heaters.

Mash/lauter tun 20 and water heater 30 are in fluid communication via water return tubing 90, wherein water return tubing 90 fluidly connects hot water outlet 80 to hot water return inlet 165 of water heater 30, and wherein hot return shut off valve 160 controls the flow of water or fluid from mash/lauter tun 20 into water heater 30. It will be recognized by those skilled in the art that any known means may be utilized to control the flow and movement of water or fluid from mash/lauter tun 20 to water heater 30 other than tubing and a valve. Alternately, instead of tubing, fluid communication between mash/lauter tun 20, water heater 30 and/or wort container 40 could be hard plumbed with pipe. Also alternately, connections could be made from quick disconnects 650, 660, wherein quick disconnects 650, 660 can be switched to change the flow direction through rotating heat exchanger 260, should such be selected. It will be recognized by those skilled in the art that all tubing connections could be made utilizing quick disconnects, although only quick disconnects 650, 660 are showed as representative examples. Further, use of quick disconnects could obviate the need for controlling valves.

Additionally, mash/lauter tun 20 and water heater 30 are in fluid communication via hot water tubing 180, wherein hot water tubing 180 connects hot water supply 195 to hot water inlet 110 via pump 170, and wherein hot water tank drain valve 190 and hot water inlet valve 130 can be selectively utilized to control the flow of fluid from water heater 30 to mash/lauter tun 20 when hot water is no longer needed or for disassembly do clean mash/lauter tun 20. It will be recognized by those skilled in the art that any known means could be utilized to control the flow and movement of fluid from mash/lauter tun 20 to water heater 30. Particularly as noted above, instead of tubing, fluid communication between mash/lauter tun 20 and water heater 30 could be achieved by hard plumbing with pipe.

Further, mash/lauter tun 20 is in fluid communication with wort container 40 via wort transfer tubing 150, wherein wort transfer tubing 150 transfers wort runoff from wort outlet 120 to wort container 40, and wherein wart outlet valve 140 controls the flow of wort runoff from mash/lauter tun 20 to wart container 40. It will be recognized by those skilled in the art that any known means in the art may be utilized to control the flow and movement of fluid from mash/lauter tun 20 to wart container 40. Particularly, instead of tubing, fluid communication between mash/lauter tun 20 to wart container 40 could be achieved via hard plumbing with pipe Referring now more specifically to FIGS. 2-7, tank 50 of mash/lauter tun 20 comprises heat exchanger 260 and double false bottom filter 270, wherein double false bottom filter 270 is disposed at bottom 54 of tank 50. Thermometers 100a, 100b, 100c comprise tips 290, wherein tips 290 extend to near the center of tank 50 of mash/lauter tun 20 in order to provide indication of temperature near the center of mash M. Any number of thermometers could be utilized in any position, top, middle or bottom, to monitor striation of heat from top to bottom of mash/lauter tun 20.

Referring now more specifically to FIG. 4, heat exchanger 260 comprises feed stem 340a, drain stem 340b, and primary loops 320a, 320b in fluid communication with secondary loops 330a, 330b, wherein primary loops 320a, 320b have pinch points 350a, 350b, respectively therein, and wherein pinch points 350a, 350b block flow therethrough. Primary loops 320a and 320b are in fluid communication with feed stem 340a and drain stem 340b, wherein hot fluid enters heat exchange 260 via feed stem 340a and travels through primary loops 320a, 320b and secondary loops 330a, 330b, exiting heat exchanger 260 via drain stem 340b.

Each secondary loop 330a, 330b comprises, and is in fluid communication with, outer loop 360a, 360b and inner loop 370a, 370b, respectively, wherein pinch points 350a, 350b direct the flow of water or liquid through inner loops 370a, 370b and outer loop 360a, 360b, and wherein physical connection, but not fluid communication, through pinch points 350a, 350b provides structural strength to heat exchanger 260. Secondary loops 330a, 330b further comprise, and are in fluid communication with, tops 380a, 380b, respectively, having first ends 400*a*, 400*b*, respectively, in fluid communication therewith, and wherein second ends 405*a*, 405*b*, respectively, are in fluid communications with spargers 420*a*, 420*b*, respectively, disposed thereon. Spargers 420*a*, 420*b* comprise pressure releases 700 to permit flow of water through spargers 420*a*, 420*b* once a design-selected pressure threshold has been reached, thereby providing sprinkling of water supplied through rotating heat exchanger 260 to sparge mash M. Spargers 420*a*, 420*b* could alternately comprise caps that are removed to permit flow through spargers 420*a*, 420*b* in lieu of pressure releases 700.

Secondary loops 330*a*, 330*b* further comprise gaps 280, wherein thermometers 100*a*, 100*b*, 100*c* extend through gaps 280 to near the center of tank 50, and wherein gaps 280 permit rotation of heat exchanger 260 without same impacting thermometers 100*a*, 100*b*, 100*c*.

Figure 6:
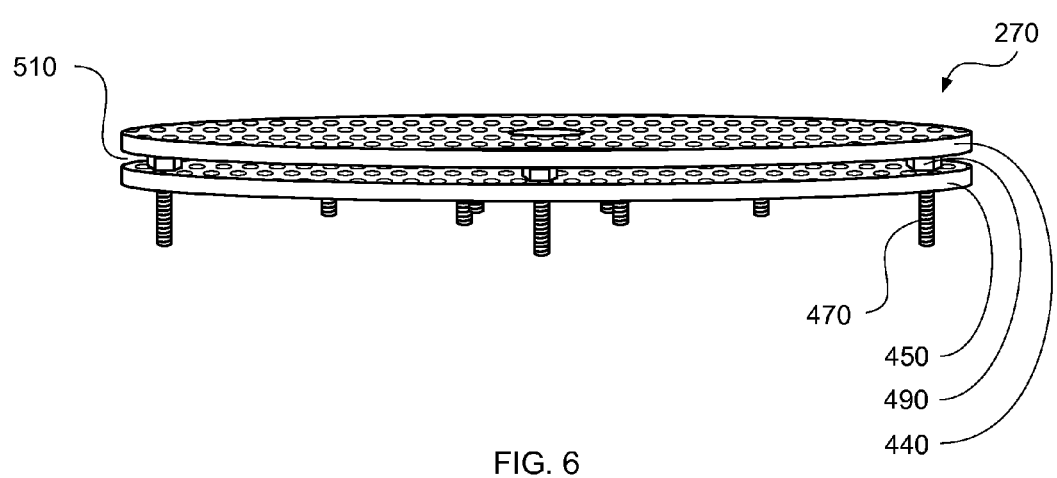
FIG. 6 is a perspective view of a double false bottom filter assembly according to a preferred embodiment.
Figure 7:
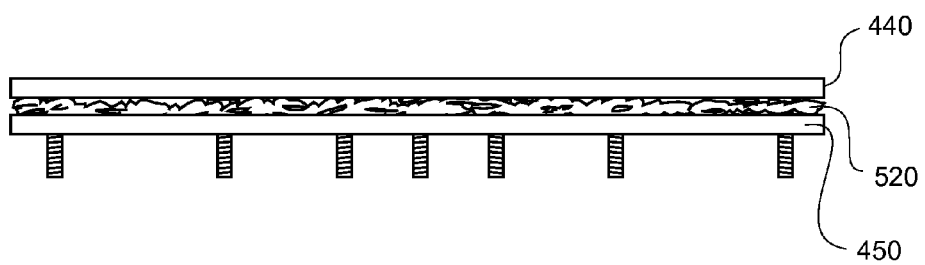
FIG. 7 is side view of a double false bottom filter according to a preferred embodiment, shown with filtration media in place.

Referring now to FIGS. 5-7, double false bottom filter 270 comprises top panel 440 and bottom panel 450, wherein top panel 440 and bottom panel 450 comprise apertures 460, and wherein apertures 460 permit passage of fluid therethrough while rejecting passage of mash grains and/or their husks. Bottom panel 450 further comprises standoffs 470 and throughhole 480 at the center thereof, wherein throughhole 480 is dimensioned to permit passage of lower feed 670 of heat exchanger 260 therethrough. Top panel 440 comprises separators 490 and throughhole 500 at the center thereof same, wherein throughhole 500 permits passage of lower feed 670 therethrough. When assembled (best shown in FIG. 6), top panel 440 is disposed on bottom panel 450, wherein separators 490 support top panel 440 on bottom panel 450, forming space 510 between top panel 440 and bottom panel 450. Space 510 is optionally filled with selected filter medium 520. Filter medium 520 further provides back pressure that prevents mash grains from readily falling through apertures 460. Standoffs 470 support double false bottom filter 270 above base 54 of tank 250, to permit flow of wort through double false bottom filter 270 to base 53 for collection.

Figure 8:
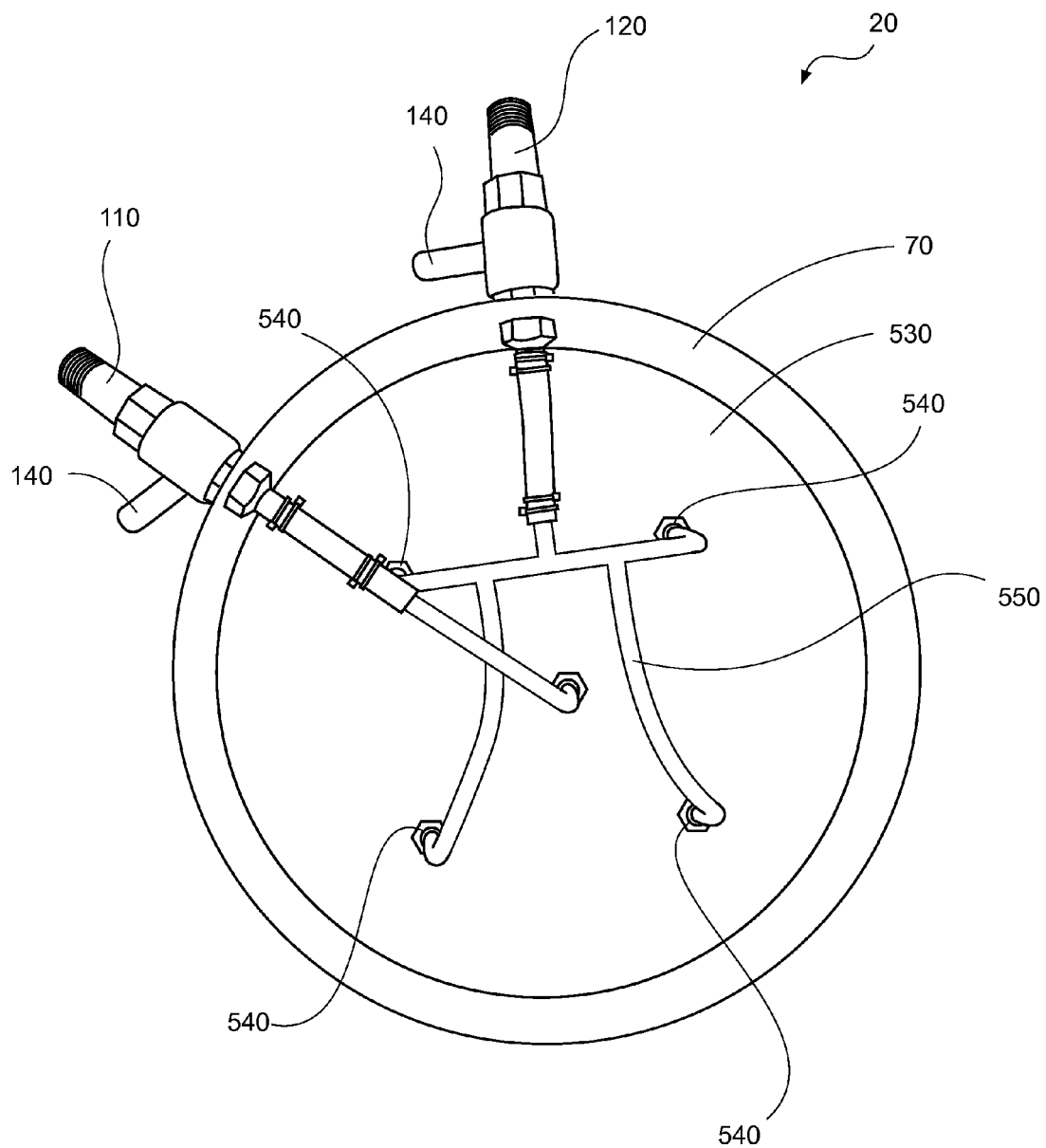
FIG. 8 is a bottom perspective view of a mash/lauter tun according to a preferred embodiment.

Referring now to FIG. 8, underneath 530 of mash/lauter tun 20 comprises drain 540 and manifold 550, wherein manifold 550 is in fluid communication with wort outlet 120. Further, underneath 530 of mash/lauter tun comprises hot water inlet 110, wherein the flow of water or fluid is controlled via hot water inlet valve 130.

Figure 9:
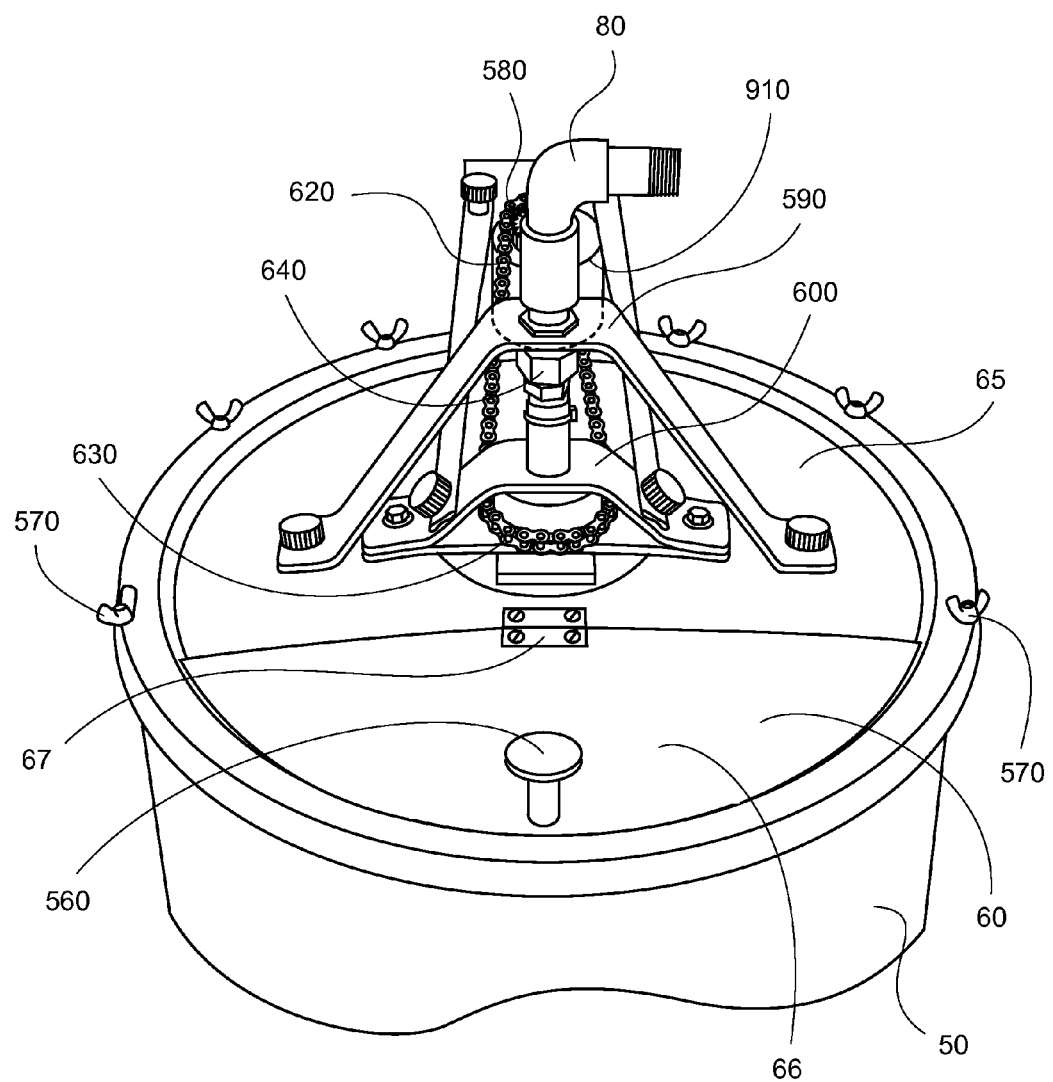
FIG. 9 is a perspective view of the top of a mash/lauter tun according to a preferred embodiment.

Referring now to FIG. 9, lid 60 of mash/lauter tun 20 comprises rear 65 and front access 66, wherein rear 65 and front access 66 are hingedly secured via hinge 67, and wherein handle 560 is disposed on front access 66 to lift same to provide access to interior of mash/lauter tun 20. It will be recognized by those skilled in the art that any known means may connect rear 65 and front access 66 other than a hinge, such as, for exemplary purposes only, a rotating clasp. Disposed on top of lid 60 are upper support 590, lower support 600, drive sprocket 580 and heat exchanger sprocket 630. Drive sprocket 580 is driven by a motor 910. Motor 910 can be any motor as is known in the art for rotating a chain sprocket drive mechanism, including, without limitation, an electric motor. Drive sprocket 580 and heat exchanger sprocket 630 are in rotational communication via chain 620, wherein rotation of drive sprocket 580 by motor 910 drives chain 620, and, subsequently, chain 620 rotates heat exchanger sprocket 630, wherein heat exchanger sprocket 630 is secured to rotating heat exchanger 260 thereby rotating heat exchanger 260, while swivel brushing 640 permits rotation of rotating heat exchanger 260 without leaking fluid.

In use, grains are loaded into tank 50 of mash/lauter tun 20, and water is added to form mash M. Mash M is continuously heated and stirred via heat exchanger 260. Hot water is introduced to heat exchanger 260 by opening hot water inlet 110, thereby passing water through heat exchanger 260 via hot water inlet valve 130, wherein hot water or fluid is circulated through primary and second loops 320, 330, respectively of heat exchanger 260. As mash M is heated, heat exchanger 260 is rotated, thereby stirring mash M. Mash M is heated and rotated until mash M reaches a threshold temperature as recorded by thermometers 100*a*, 100*b*, 100*c*, thereby producing wort. It will be recognized by those skilled in the art that thermometers 100*a*, 100*b*, 100*c* could comprise thermocouples and could be in electrical communication with a controller (not shown) to automate the entire mashing/lautering process. In such alternate configuration, hot water inlet valve 130, hot water return shut off valve 160 and hot water tank drain valve 190 could be solenoid or similar valves, without limitation.

After wort is produced, the separation process begins. Much of the wort drains off of the grains during the mashing process and is collected at base 54. When mashing is complete, hot water is sprayed over the wort via spargers 420, thereby rinsing liquid wort off the grains and allowing the wort to pass to base 54 for collection. The mash rests on, and is retained by, double false bottom filter 270, wherein the liquid wort flows through apertures 460 of top panel 440, then through filter medium 520 and subsequently through bottom panel 450, wherein filter medium 520 comprises, for exemplary purposes only, rice hulls. The liquid wort then exits tank 50 via drain 540 through manifold 550 and flows into wort container 40 by selectively opening wort outlet 120 via wort outlet valve 140, wherein the liquid wort is transferred from mash/lauter tun 20 to wort container 40 via wort transfer tubing 150. Once the liquid wort is transferred to wort container 40, it can be boiled and fermented to produce alcohol.

In an alternate embodiment, quick disconnects could be utilized to secure tubings 90, 180 and 150 to facilitate cleaning and/or rotating of flow. For instance, switching quick disconnects 650 and 660 would optionally reverse the flow of fluid in heat exchanger 260.

The foregoing description and drawings comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions and the associated drawings. Although specific terms may be employed herein, they are used in a generic and descriptive sense only and not for purposes of limitation. Accordingly, the present invention is not limited to the specific embodiments illustrated herein, but is limited only by the following claims.

What is claimed is:
1. A mash/lauter tun comprising:
   a tank comprising a bottom;
   a double false bottom filter comprising two perforated plates disposed parallel with a space therebetween, wherein said double false bottom filter is disposed at said bottom of said tank; and
   a rotating heat exchanger and a sparging nozzle operated by pressure within said rotating heat exchanger, wherein said rotating heat exchanger is disposed within said tank.

2. The mash/lauter tun of claim 1, wherein said double false bottom filter further comprises a filter medium disposed within said space.

3. The mash/lauter tun of claim 1, wherein said double false bottom filter comprises a seal on the periphery of said two perforated plates.

4. The mash/lauter tun of claim 1, wherein said container further comprises at least one thermometer.

5. The mash/lauter tun comprising:
a tank comprising a bottom;
a double false bottom filter comprising two perforated plates disposed parallel with a space therebetween, wherein said double false bottom filter is disposed at said bottom of said tank; and
an outlet, wherein said outlet is in fluid communication with a hot water heater and a rotating heat exchanger.

6. The mash/lauter tun of claim 5, wherein said tank comprises an inlet for the inflow of water from said hot water heater, and wherein said inlet is in fluid communication with said rotating heat exchanger.

7. The mash/lauter tun of claim 6, wherein said tank further comprises a valve, wherein said valve controls flow of fluid through said outlet.

8. The mash/lauter tun of claim 7, wherein said tank further comprises at least one pressure-operated sparge nozzle, wherein said at least one pressure-operated sparge nozzle permits fluid flow therethrough when said valve is closed.

* * * * *